(12) United States Patent
Ganesan et al.

(10) Patent No.: US 10,833,895 B2
(45) Date of Patent: Nov. 10, 2020

(54) RECEIVER WITH SELECTABLE DIGITAL EQUALIZATION FILTER OPTIONS

(71) Applicant: Texas Instruments Incorporated, Dallas, TX (US)

(72) Inventors: Raghu Ganesan, Bengaluru (IN); Kalpesh Laxmanbhai Rajai, Bengaluru (IN); Saravanakkumar Swaminathan Radhakrishnan, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/575,151

(22) Filed: Sep. 18, 2019

(65) Prior Publication Data
US 2020/0092144 A1    Mar. 19, 2020

(30) Foreign Application Priority Data
Sep. 19, 2018 (IN) .............................. 201841035265

(51) Int. Cl.
*H03K 5/159* (2006.01)
*H04L 25/03* (2006.01)
*H04B 1/16* (2006.01)

(52) U.S. Cl.
CPC ......... *H04L 25/03057* (2013.01); *H04B 1/16* (2013.01)

(58) Field of Classification Search
CPC .......................... H04L 25/03057; H04B 1/16
USPC .................................................. 375/232–236
See application file for complete search history.

(56) References Cited

U.S. PATENT DOCUMENTS

| 7,085,328 B2 * | 8/2006 | Lin ......................... H04L 27/34 375/261 |
| 7,254,198 B1 * | 8/2007 | Manickam ........ H04L 25/03057 375/233 |
| 2004/0090981 A1 * | 5/2004 | Lin .................... H04L 25/03146 370/445 |
| 2007/0201583 A1 * | 8/2007 | Yen ........................ H04L 25/022 375/340 |
| 2011/0058597 A1 * | 3/2011 | Huckett .............. H04L 25/0314 375/232 |
| 2014/0146858 A1 * | 5/2014 | Luschi ................. H04B 1/7115 375/148 |
| 2016/0352557 A1 * | 12/2016 | Liao .................... H04L 27/3809 |

* cited by examiner

*Primary Examiner* — Don N Vo
(74) *Attorney, Agent, or Firm* — John R. Pessetto; Charles A. Brill; Frank D. Cimino

(57) ABSTRACT

A device includes a receiver having analog front-end circuitry and a digital signal processing (DSP) circuit. The DSP circuit is configured to select one of a plurality of digital equalization (DEQ) filter options and to perform DEQ operations based on the selected DEQ filter option, wherein the DSP circuit is configured to select one of the plurality of DEQ filter options based on a channel length estimate and a plurality of different sets of DEQ filter coefficients predetermined for different channel lengths.

6 Claims, 14 Drawing Sheets

US 10,833,895 B2

RECEIVER WITH SELECTABLE DIGITAL EQUALIZATION FILTER OPTIONS

CROSS-REFERENCE TO RELATED APPLICATIONS

This application claims priority to Indian Provisional Application No. 201841035265, filed Sep. 19, 2018, which is hereby incorporated by reference.

BACKGROUND

The proliferation of networked electronic devices continues along with related efforts to increase signaling speed while maintaining signal integrity. The core of a communication link consists of a transmitter that generates the signal, a channel that carries the signal and a receiver that accepts the signal and processes it correctly. Signals can be carried by channels as electrical signals, optical pulses, or electromagnetic signals. For accurate signaling between networked devices or components, the integrity of the signal needs to be maintained. From a physical layer standpoint, this means that if a "1" is sent from the transmitter and down the channel, be it copper, optical fiber or air, the receiver should also determine that the signal is a "1". This is a fundamental challenge for data transmission system and circuit designers due to the various factors affecting signal integrity.

Signal integrity in data transmission systems is affected by a number of factors. Apart from random noise, atmospheric and man-made noise, there are deterministic factors that contribute to deteriorating signal integrity. Copper-based signal transmission is affected by the limited bandwidth of copper channels and crosstalk from adjacent channels. Optical signals are affected by frequency-independent loss of optical power as they travel down the fiber as well as dispersion-causing mechanisms depending on the type of fiber. Signal Integrity issues can result in inter-symbol-interference (ISI) at the receiver. Typically, ISI deteriorates as the data rate and the length of the channel increases. ISI is the primary factor limiting transmission distances over copper-based transmission channels and optical fiber at high data-rates (e.g., 10-Gb/sec). Efforts to compensate for ISI and otherwise maintain signal integrity has resulted in various transmitter-side and receiver-side technologies, including equalization.

Equalization is a process of conditioning the electrical signal, either at the transmitter or the receiver to compensate for channel-induced ISI and improve signal integrity. Linear and non-linear equalization techniques have been explored in the literature. Efforts to improve equalization designs are ongoing.

SUMMARY

A device comprises a receiver having analog front-end circuitry and a digital signal processing (DSP) circuit. The DSP circuit is configured to select one of a plurality of digital equalization (DEQ) filter options and to perform DEQ operations based on the selected DEQ filter option, wherein the DSP circuit is configured to select one of the plurality of DEQ filter options based on a channel length estimate and a plurality of different sets of DEQ filter coefficients predetermined for different channel lengths.

A DSP circuit comprises a DEQ filter with selectable coefficients. The DSP circuit also comprises a decision (such as a slicer) circuit coupled to the DEQ filter. The DSP circuit also comprises decision-feedback equalizer (DFE) coupled to the DEQ filter. The DSP circuit also comprises a gain loop coupled to the DEQ filter. The DSP circuit also comprises a clock recovery circuit coupled to the decision circuit. The DSP circuit also comprises a controller coupled to the DEQ filter, wherein the controller is configured to select the coefficients for the DEQ filter based on at least one selection criterion.

A method comprises receiving an input signal. The method also comprises filtering the input signal using an analog filter system. The method also comprises converting an output of the analog filter system to a digital signal. The method also comprises selecting one of a plurality of DEQ filter options. The method also comprises filtering the digital signal based on the selected DEQ filter option.

BRIEF DESCRIPTION OF THE DRAWINGS

For a detailed description of various examples, reference will now be made to the accompanying drawings in which.

DETAILED DESCRIPTION

Disclosed herein are digital equalization (DEQ) topologies involving a plurality of DEQ filter options. In some examples, the disclosed DEQ topologies are part of a digital signal processor (DSP) for a receiver or transceiver in the form of an integrated circuit (IC), a chip, a multi-die module (MDM), or another circuit device. A receiver or transceiver device with a DSP may also include other components such as analog signal chain components before the DSP, or digital signal chain (such as linear repeater) components after the DSP.

In some examples, the plurality of DEQ filter options correspond to a DEQ filter with selectable coefficients, where different sets of the coefficients are used depending on a selection control scheme. In some examples, the DEQ filter is an odd tap symmetric finite impulse response (FIR) filter with selectable coefficients. Regardless of the particular DEQ filter used for DEQ equalization, the selection control scheme may use a channel length estimate to select between different sets of filter coefficients. For example, different channel length estimates are indexed to different sets of coefficients. As another example, an automatic gain control value is used as the channel length estimate, where different automatic gain control values are indexed to different sets of coefficients. In other examples, the selection control scheme involves a sweeping operation that determines which of the different sets of DEQ filter coefficients optimizes a performance metric. In different examples, the performance metric is at least one of a decision feedback equalizer (DFE) coefficient metric, a mean-square-error (MSE) noise metric, and at least one pre-cursor value. As desired, the performance metric used to select between different sets of DEQ filter coefficients is calibrated. In some examples, such calibration involves scaling a mean-square-error (MSE) threshold and using the scaled MSE threshold as some or all of the performance metric used to select between different sets of DEQ filter coefficients. Also, in some examples, signal processing feed-forward equalization (FFE) operations are selectively enabled or disabled with the DEQ filter. In different examples, DEQ filters are configured to run at one sample per symbol (referred to as "symbol rate") or multiple samples per symbol. To provide a better understanding, various DEQ topology options, related circuit options, and related method options are described using the figures as follows.

Figure 1:
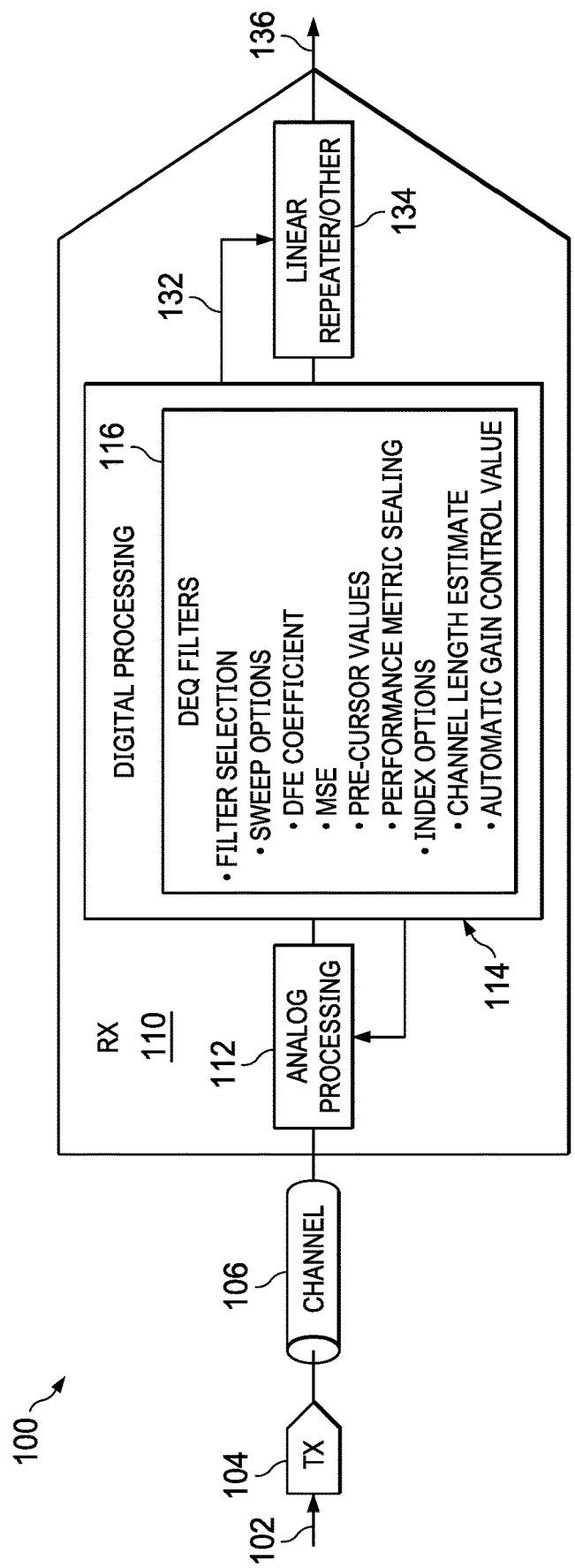
FIG. 1 is a block diagram showing a communication system in accordance with some examples.

FIG. 1 is a block diagram showing a communication system 100 in accordance with some examples. As shown, the communication system 100 includes a transmitter 104, a channel 106, and a receiver 110, where the receiver 110 employs an analog processing circuit 112 including an analog to digital converter (ADC), and a digital processing circuit 114 to perform equalization operations, which facilitate recovery of source data 102 transmitted by the transmitter 104 via the channel 106. The channel 106 represents one or more physical transmission mediums (e.g., wires, air, optical fiber, etc.) used to convey signals between the transmitter 104 and the receiver 110. In operation, the transmitter 104 receives the source data 102 and conveys a signal representing the source data 102 to the channel 106. The receiver 110 operates to receive the signals from the channel 106 and to recover the source data 102. As desired, the receiver 110 stores recovered data locally and/or passes recovered data linearly to another communication link. In some examples, the receiver or transceiver is implemented in the form of integrated circuit (IC), chip, multi-die module (MDM), or other circuit device.

Recovering the source data 102 at the receiver 110 involves various operations, including those performed by the digital processing circuit 114. Example operations of the digital processing circuit 114 include "equalizing" receiver-side signals. The equalized receiver-side signals enhance recoverability of the source data 102 at least during particular intervals in time. By improving the equalization operations of the digital processing circuit 114, higher-speed signaling is possible due to a reduction in intersymbol interference (ISI). In addition, the DEQ filters 116 represented in FIG. 1, can reduce the size of the analog processing circuit 112 (e.g., by eliminating some analog equalization (AEQ) circuitry) to achieve an overall reduction in IC size for the receiver 110. In some examples, the receiver 110 with the DEQ filters 116 is in the form of an IC, a chip, a multi-die module (MDM), or other circuit device.

In some examples, the DEQ filters 116 represent to a DEQ filter with selectable coefficients such that a plurality of filter transfer function options are available. More specifically, in one example, the DEQ filters 116 correspond to an odd tap symmetric finite impulse response (FIR) filter with selectable coefficients. Regardless of the particular DEQ filter topology used for DEQ equalization, the available DEQ filter options represented by the DEQ filters 116 of the digital processing circuit 114 are selected based on a selection control scheme. In some examples, the selection control scheme comprises sweeping options involving sweeping through different DEQ filter options to identify which of the different DEQ filter options optimizes or complies with a performance metric. In some examples, the performance metric is at least one of a DFE coefficient metric, an MSE noise metric, and at least one pre-cursor value. Also, as desired, the performance metric used to select between different sets of DEQ filter coefficients is calibrated. In some examples, such calibration involves scaling an MSE noise threshold and using the scaled MSE noise threshold as some or all of the performance metric used to select between different sets of DEQ filter coefficients. In other examples, the selection control scheme comprises indexed options involving receiving an input value and matching the received input value to indexed sets of DEQ filter coefficients. In one example, the received input value is a channel length estimate (e.g., 50 m-150 m). In another example, the received input value is an automatic gain control (AGC) value or another value that varies as a function of channel length. After DEQ operations by the digital processing circuit 114 are complete, an equalized signal 132 is output from the digital processing circuit 114 and is provided to a subsequent component (e.g., a linear repeater or other component 134).

Figure 2:
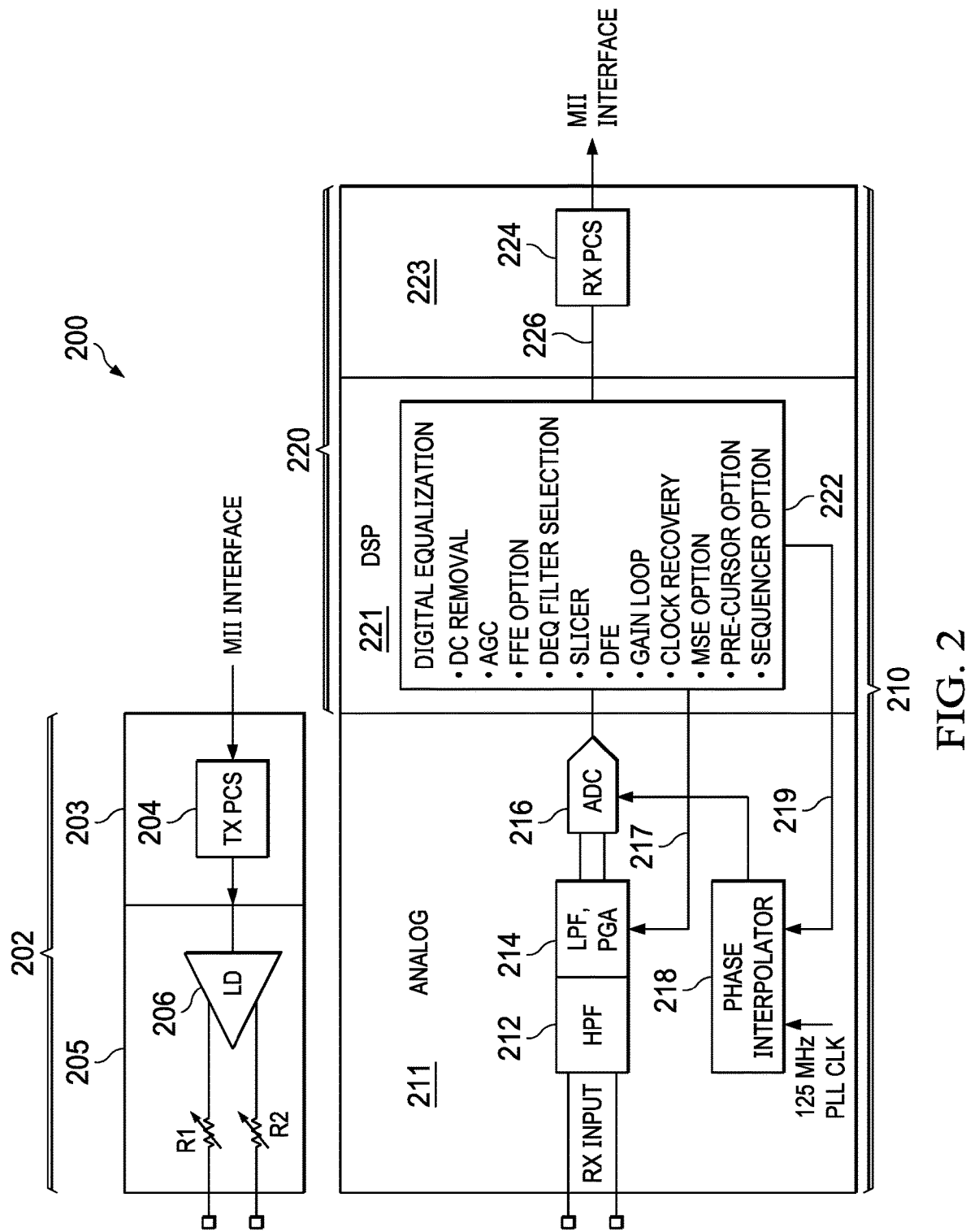
FIG. 2 is a block diagram showing a transceiver in accordance with some examples.

FIG. 2 is a block diagram showing a transceiver 200 in accordance with some examples. As shown, the transceiver 200 includes a transmitter portion 202 and a receiver portion 210. In some examples, the transceiver 200 corresponds to an IC, a chip, an MDM, or other circuit device. As shown, the transmitter portion 202 includes a digital domain 203 with a transmitter (TX) physical coding sublayer (PCS) logic 204.

In the example of FIG. 2, the transceiver 200 is part of an optical communication system and thus the transmitter portion 202 includes an analog domain 205 with a laser diode 206 and related resistive components, R1 and R2. Meanwhile, the receiver portion 210 includes an analog domain 211 with a first analog circuit 212 that includes a high-pass filter (HPF). The analog domain 211 also includes a second analog circuit 214 that includes a low-pass filter (LPF) and a programmable gain amplifier (PGA). The output of the second analog circuit 214 is provided to an analog-to-digital converter (ADC) 216 clocked by a phase interpolator 218. In some examples, the clock signal from the phase interpolator 218 is based on a phase-locked loop (PLL) clock (e.g., at 125 MHz) and a feedback signal 219 from the digital domain 220 of the receiver 210. More specifically, digital domain 220 includes a DSP 221 configured to provide the feedback signal 219 and to perform digital equalization (DEQ) as described herein. The DSP 221 is also configured to provide an AGC signal 217 to the second analog circuit 214 to adjust the PGA. Also, the equalized signal 226 output from the DSP 221 is provided to receiver PCS logic 224 for further processing.

In the example of FIG. 2, the DSP 221 includes a DEQ circuit 222 with various features including a DC removal feature, an AGC feature, an FFE feature option, a DEQ filter selection feature (e.g., indexed options or sweep options), a decision/slicer feature, a DFE feature, a gain loop feature, a clock recovery feature, an MSE feature option, a pre-cursor feature option, and a sequencer option. These example features correspond to one or more circuits. In different examples, these features are combined in different ways and/or some features are omitted.

Figure 3:
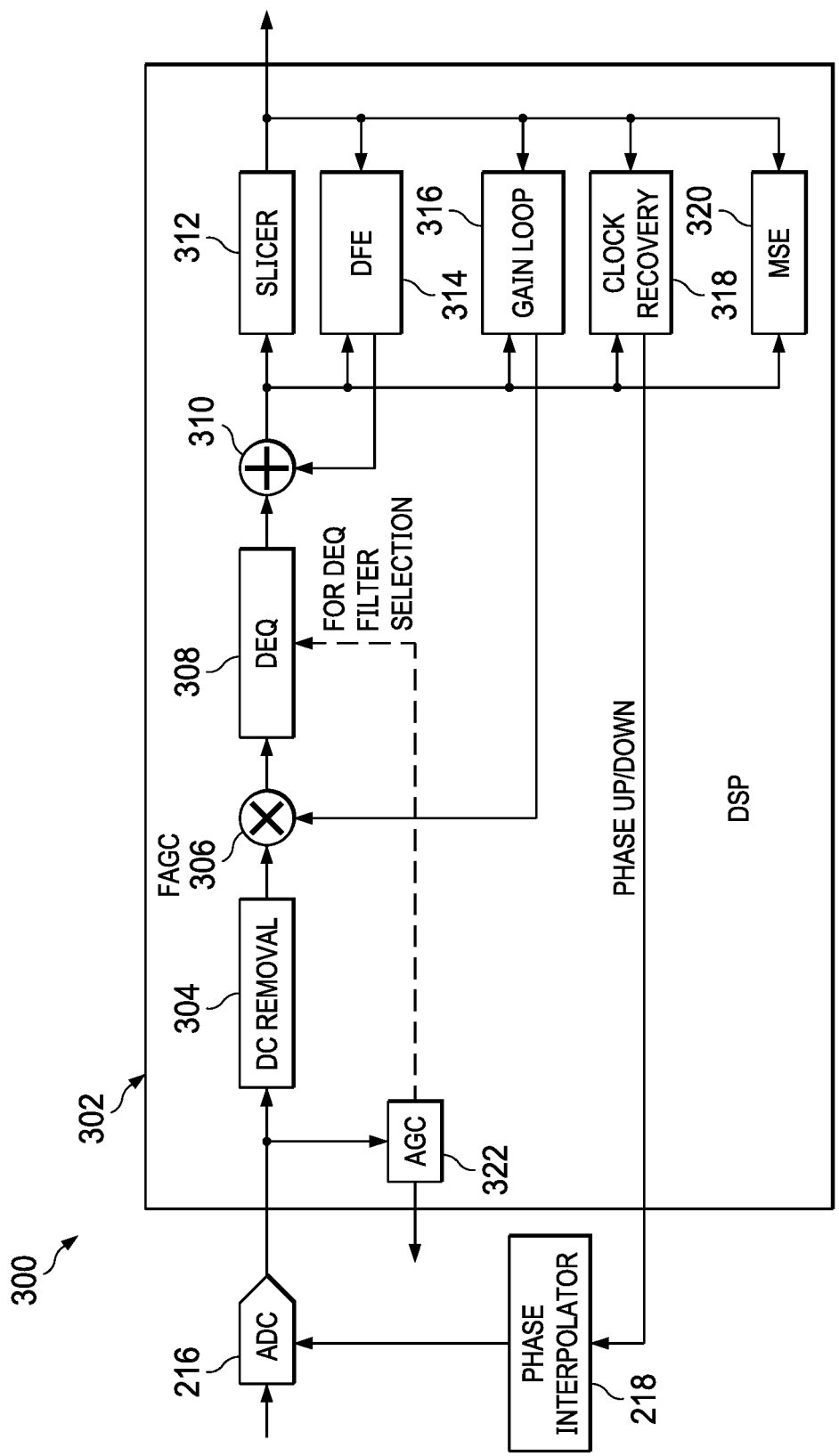
FIG. 3 is a block diagram showing part of a receiver in accordance with some examples.

FIG. 3 is a block diagram showing part of a receiver 300 (an example of the receiver 110 in FIG. 1, or the receiver portion 210 in FIG. 2) in accordance with some examples. As shown, the receiver 300 includes the ADC 216 and the phase interpolator 218 introduced in FIG. 2. The receiver 300 also includes a DSP 302 (an example of the digital processing circuit 114 of FIG. 1, or the DSP 221 of FIG. 2). As shown, the DSP 302 includes a DC removal circuit 304 and an AGC circuit 322 coupled to an output of the ADC 216. In some examples, the AGC circuit 322 generates an AGC index value for use by an analog circuit (e.g., the second analog circuit 214 of FIG. 2) and by a DEQ circuit 308.

In the example of FIG. 3, the DC removal circuit 304 filters a DC component from the output of the ADC 216 and provides an output to a multiplication circuit 306. The multiplication circuit 306 performs a fine AGC (FAGC) adjustment by multiplying the output of the DC removal circuit 304 and the output of a gain loop circuit 316. As shown, the output of the multiplication circuit 306 is provide to the DEQ circuit 308. In some examples, the DEQ circuit 308 includes a controller (not shown) and a DEQ filter, where the controller selects between different DEQ filter options based on an AGC index value provided by the AGC circuit 322. The selected DEQ filter option is used by the DEQ circuit 308 to perform DEQ filtering. In some examples, the selected DEQ filter option is configured to run at for one sample per symbol. As shown, the output of the DEQ circuit 308 is provided to a combine circuit 310, where the combine circuit 310 is configured to combine the output of the DEQ circuit 308 with the output of a DFE circuit 314 (e.g., subtract the output of the DFE circuit 314 from the output of the DEQ circuit 308).

In the example of FIG. 3, the DSP 302 also includes a gain loop circuit 316, a clock recovery circuit 318, and an MSE circuit 320 coupled to the output of the combine circuit 310 and the output of a decision circuit such as a slicer circuit 312. As previously noted, the output of the DFE circuit 314 is provided to the combine circuit 310, and the output of the gain loop circuit 316 is provided to the multiplication circuit 306. In the example of FIG. 3, the clock recovery circuit 318 uses the output of the slicer circuit 312 and the output of the combine circuit 310 to determine an adjustment signal (e.g., phase up or phase down) for the phase interpolator 218. The loop formed in part by the clock recovery circuit 318 and the phase interpolator 218 is sometimes referred to as a "timing recovery loop". As shown, the output of the slicer circuit 312 is also the output of the DSP 302.

Figure 4:
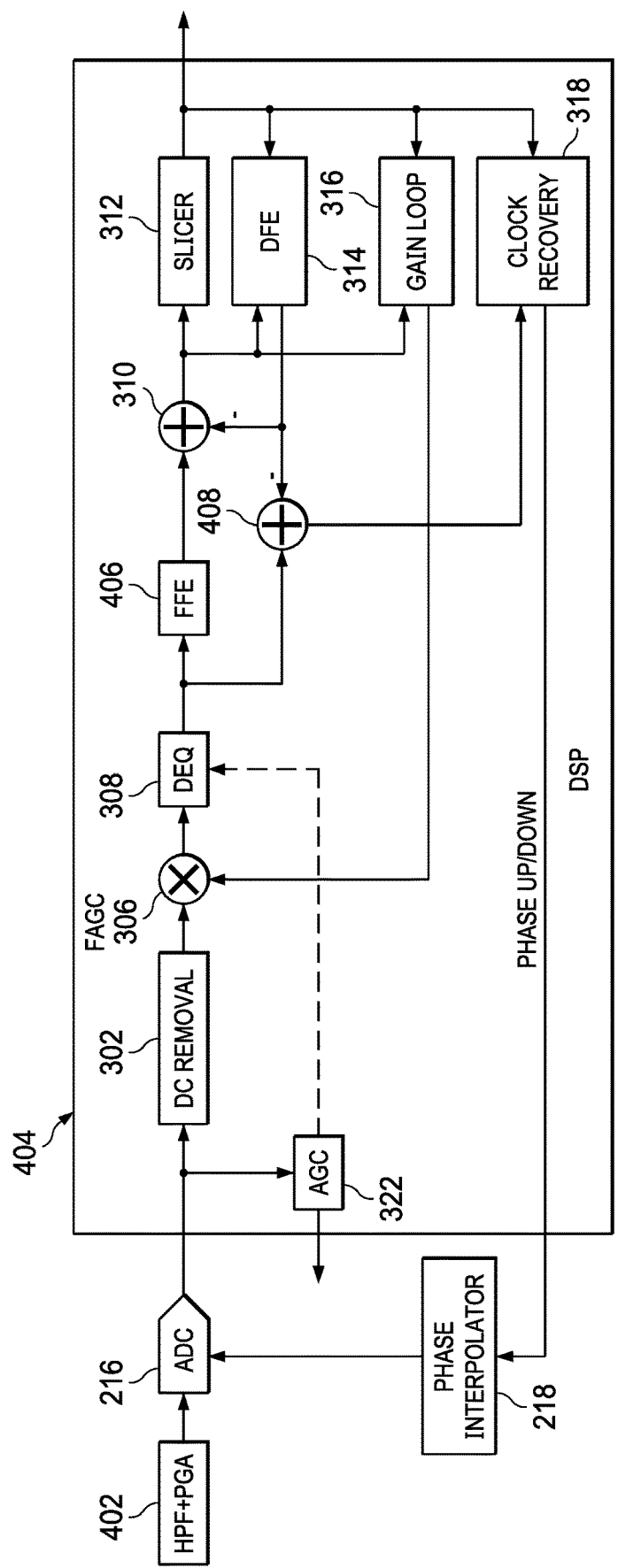
FIG. 4 is a block diagram showing part of another receiver in accordance with some examples.

FIG. 4 is a block diagram showing part of another receiver 400 (an example of the receiver 110 in FIG. 1, or the receiver portion 210 in FIG. 2) in accordance with some examples. As shown, the receiver 400 includes the ADC 216 and the phase interpolator 218 introduced in FIG. 2. The receiver 400 also includes a DSP 404 (an example of the digital processing circuit 114 of FIG. 1, or the DSP 221 of FIG. 2). As shown, the DSP 404 includes various components introduced in FIG. 3, including the DC removal circuit 304, the AGC circuit 322, the multiplication circuit 306, the DEQ circuit 308, the combine circuit 310, the slicer circuit 312, the DFE circuit 314, the gain loop circuit 316, and the clock recovery circuit 318.

In the example of FIG. 4, some additional components are used, including an FFE circuit 406, and a combine circuit 408. More specifically, the FFE circuit 406 is coupled between an output of the DEQ circuit 308 and the combine circuit 310. As desired, the FFE circuit 406 is selectively enabled or disabled (bypassed). In some examples, the FFE circuit 406 is used when the channel length is greater than a threshold. When used, the FFE circuit 406 equalized the residual channel after DEQ. Also, the combine circuit 408 is coupled to the DEQ circuit 308, the DFE circuit 314, and the clock recovery circuit 318. In some examples, the combine circuit 408 provides the difference between the output of the DFE circuit 314 and the output of the DEQ circuit 308 to the clock recovery circuit 318.

In the example of FIG. 4, the DC removal circuit 304 filters a DC component from the output of the ADC 216 and provides an output to the multiplication circuit 306. The multiplication circuit 306 multiplies the output of the DC removal circuit 304 and the output of the gain loop circuit 316. As shown, the output of the multiplication circuit 306 is provide to the DEQ circuit 308. Again, the DEQ circuit 308 may include a controller (not shown) and a DEQ filter, where the controller selects between different DEQ filter options based on an AGC index value provided by the AGC circuit 322. The selected DEQ filter option is used by the DEQ circuit 308 to perform DEQ filtering. As shown, the output of the DEQ circuit 308 is provided to the combine circuit 310 via the FFE circuit 406, where the combine circuit 310 is configured to combine the output of the DEQ circuit 308 or the FFE circuit 406 with the output of the DFE circuit 314.

In the example of FIG. 4, the DFE circuit 314 and the gain loop circuit 316 are coupled to the output of the combine circuit 310 and to the output of the slicer circuit 312. The clock recovery circuit 318 is also coupled to the output of the slicer circuit 312. In the example of FIG. 4, the clock recovery circuit 318 uses the output of the slicer circuit 312 and the output of the combine circuit 408 to determine an adjustment signal (e.g., phase up or phase down) for the phase interpolator 218.

Figure 5:
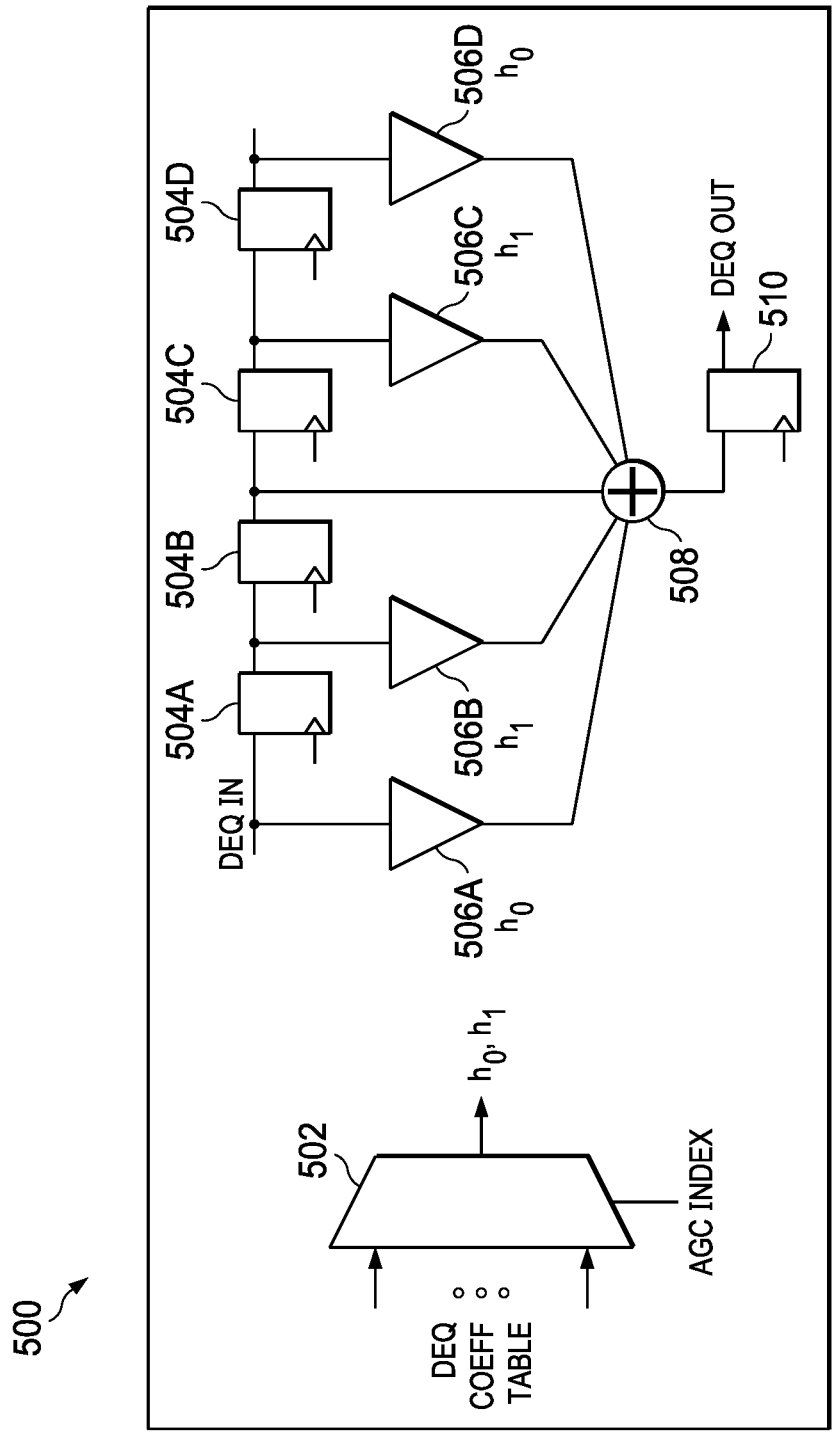
FIG. 5 is a block diagram showing a digital equalization (DEQ) filter arrangement in accordance with some examples.

FIG. 5 is a block diagram showing a DEQ filter arrangement 500 in accordance with some examples. The DEQ filter arrangement 500 corresponds to an odd tap symmetric FIR filter with 5 taps and selectable coefficients ($h_0$, $h_1$). As shown, the DEQ filter arrangement 500 comprises four latches 504A-504D and four tap components 506A-506D. More specifically, the tap component 506A is coupled to the input of the latch 504A, the tap component 506B is coupled to the input of the latch 504B and the output of the latch 504A, the tap component 506C is coupled to the output of the latch 504C and the input of the latch 504D, and the tap component 506D is coupled to the output of the latch 504D. As shown, the outputs of the tap components 506A-506D are provided to a combine circuit 508 along with the output of the latch 504B. The output of the combine circuit 508 is provided to another latch 510, where the output of the latch 510 is the DEQ output signal.

In the example of FIG. 5, the latches 504A-504D and 510 are clocked by the same clock signal to perform DEQ operations. As shown, the selectable coefficients ($h_0$, $h_1$) are provided by a multiplexer 502 with different sets of DEQ coefficients (e.g., a DEQ coefficient table) as inputs, where the control signal for the multiplexer 502 is an AGC index value. In other examples, a DEQ filter arrangement, such as the DEQ filter arrangement 500, may vary with regard to the number of taps (e.g., an odd tap symmetric FIR filter may have 3, 5, 7, or 9 taps) and coefficients. Also, in other examples, the selection of coefficients may vary. In one example, a channel length estimate value is used as the control signal for the multiplexer 502. In another example, the control signal for the multiplexer 502 is based on sweep operations as described herein.

Figure 6:
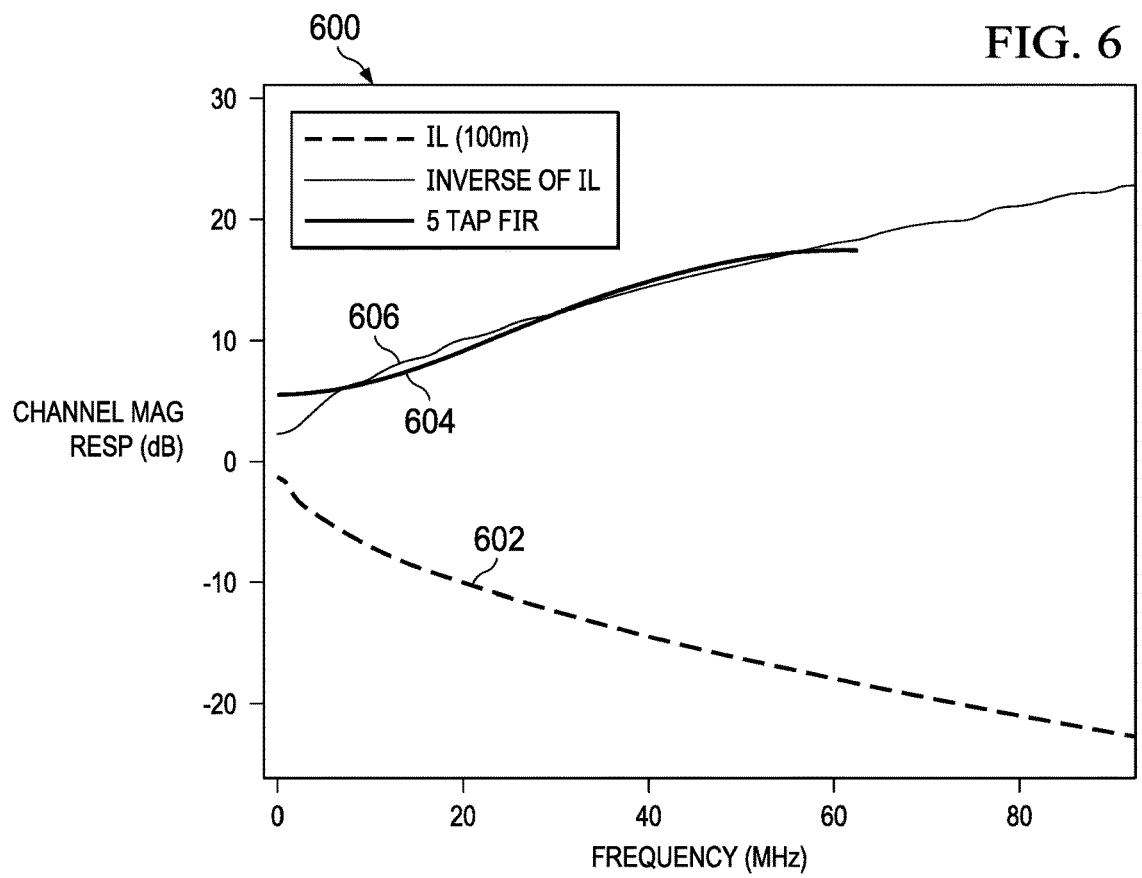
FIG. 6 is a graph showing channel response as a function of frequency in accordance with some examples.

FIG. 6 is a graph 600 showing channel response as a function of frequency in accordance with some examples. In graph 600, the curve 602 is the channel response for an insertion loss (IL) of the channel equal to 100 m. As shown, the curve 602 represents that higher frequencies are attenuated more than lower frequencies for an IL with 100 m. Meanwhile, the curve 606 represents the channel response inverse of the curve 602. Finally, the curve 606 represents a channel response due to a 5 tap FIR. As shown, the curve 606 follows the curve 602 closely. Thus, by using a 5 tap FIR or an odd tap symmetric FIR for equalization operations, a variable channel response attenuation for different frequencies (e.g., as represented by the curve 602) can be corrected to facilitate data recovery.

Figure 7:
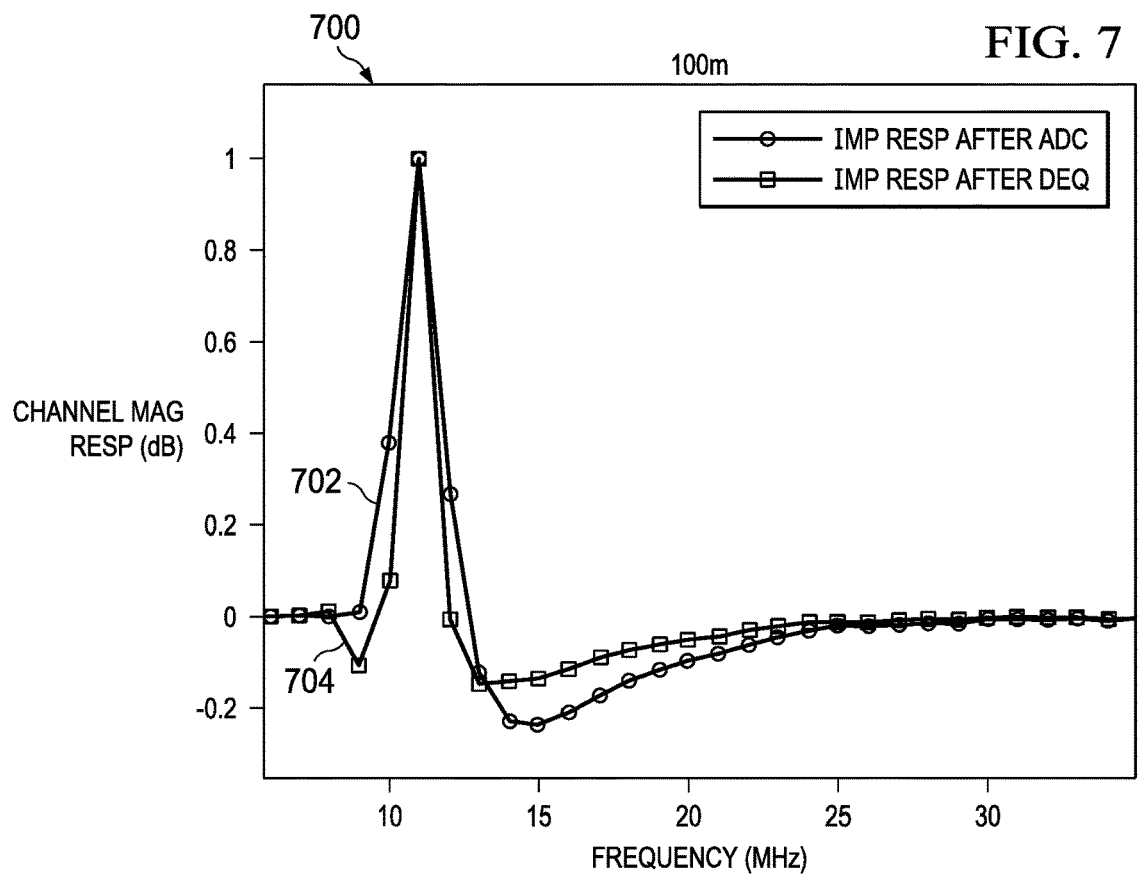
FIG. 7 is a graph showing impulse responses resulting from analog-to-digital converter (ADC) operations and from DEQ filter operations.

FIG. 7 is a graph 700 showing impulse responses resulting from ADC operations and from DEQ filter operations. In graph 700, the impulse response 702 is the result of ADC operations (e.g., operations of the ADC 216 in FIGS. 2-4), and the impulse response 704 is the result of DEQ operations (e.g., operations of the digital processing circuit 114 in FIG. 1, operations of the DSP 221 in FIG. 2, operations of the DSP 302 in FIG. 3, operations of the DSP 404 in FIG. 4). As represented in the graph 700, the impulse response 704 is better with regard to post-cursor ISI performance and worse with regard to pre-cursor ISI performance compared to the impulse response 702. The pre-cursor ISI performance may be improved by more carefully selecting a DEQ filter option based on a channel length estimate, an AGC index value, or sweep operations. In some examples, a DEQ filter option that optimizes pre-cursor values is selected for DEQ operations. Also, in some examples, the FFE output is not connected to the timing recovery loop. In such case, the timing recovery loop receives the pre-cursor ISI, where appreciable pre-cursor ISI causes the timing recovery loop to settle with an offset (i.e., a sampling offset). Accordingly, DEQ selection that reduces the pre-cursor ISI helps to mitigate the above effect.

Figure 8:
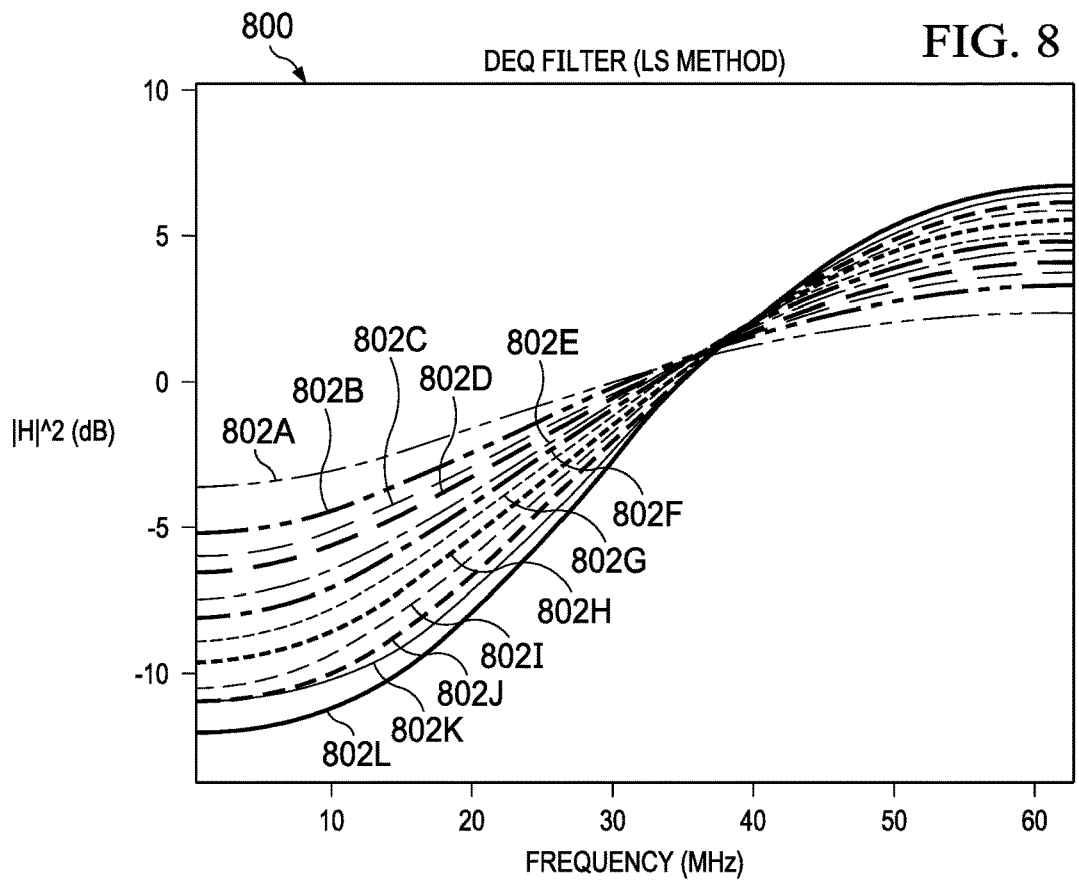
FIG. 8 is a graph showing different transfer functions for a DEQ filter in accordance with some examples.

FIG. 8 is a graph 800 showing different transfer functions 802A-802L for a DEQ filter in accordance with some examples. The different transfer functions 802A-802L correspond to different DEQ filter options (e.g., a DEQ filter with selectable coefficient). With the different transfer functions 802A-802L, the level of attenuation or gain for different frequencies varies.

Figure 9:
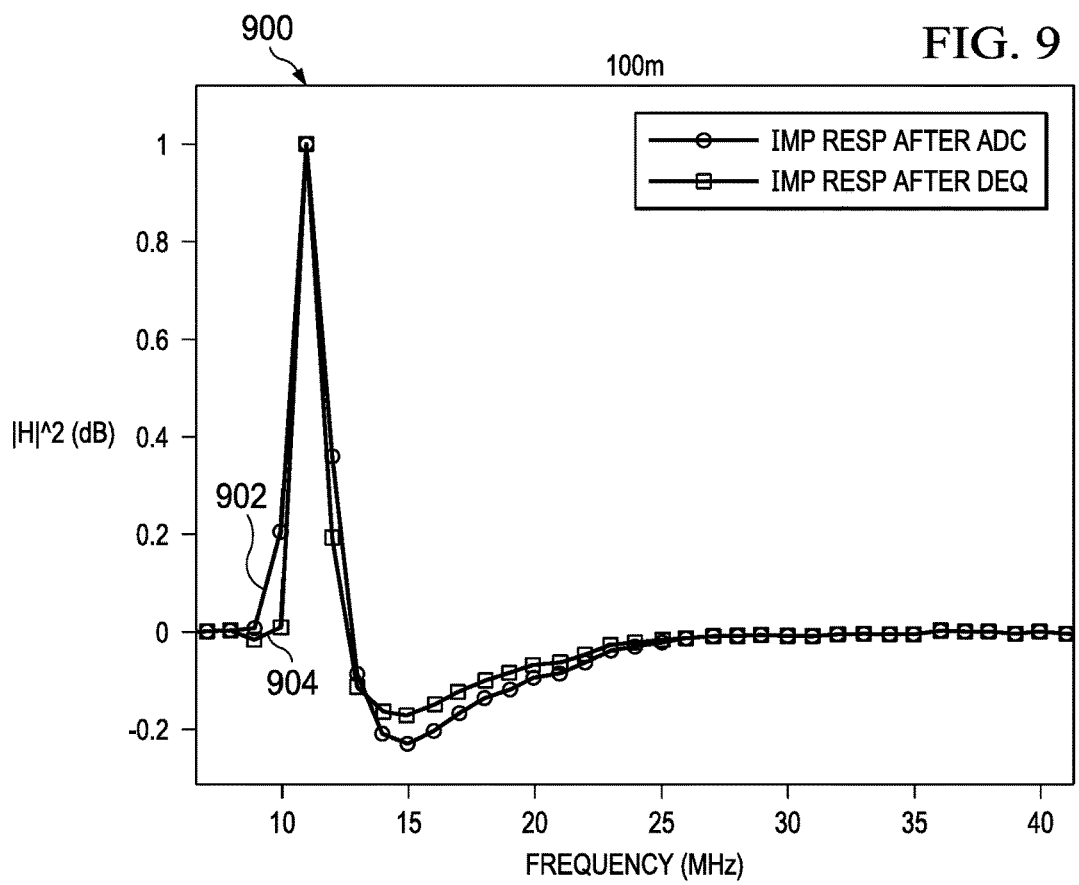
FIG. 9 is a graph showing impulse responses resulting from ADC operations and from DEQ filter operations.

FIG. 9 is a graph 900 showing impulse responses resulting from ADC operations and from DEQ filter operations. In graph 900, the impulse response 902 is the result of ADC operations (e.g., operations of the ADC 216 in FIGS. 2-4), and the impulse response 904 is the result of DEQ operations (e.g., operations of the digital processing circuit 114 in FIG. 1, operations of the DSP 221 in FIG. 2, operations of the DSP 302 in FIG. 3, operations of the DSP 404 in FIG. 4). As represented in the graph 900, the impulse response 904 is better with regard to post-cursor ISI performance and is almost the same with regard to pre-cursor ISI performance compared to the impulse response 702. In the graph 900, the pre-cursor ISI performance related to the impulse response 904 is improved relative to the input response 704 of FIG. 7 by selecting a DEQ filter option based on a channel length estimate, an AGC index value, or sweep operations as described herein. In some examples, a DEQ filter option that optimizes pre-cursor values is selected for DEQ operations.

Figure 10:
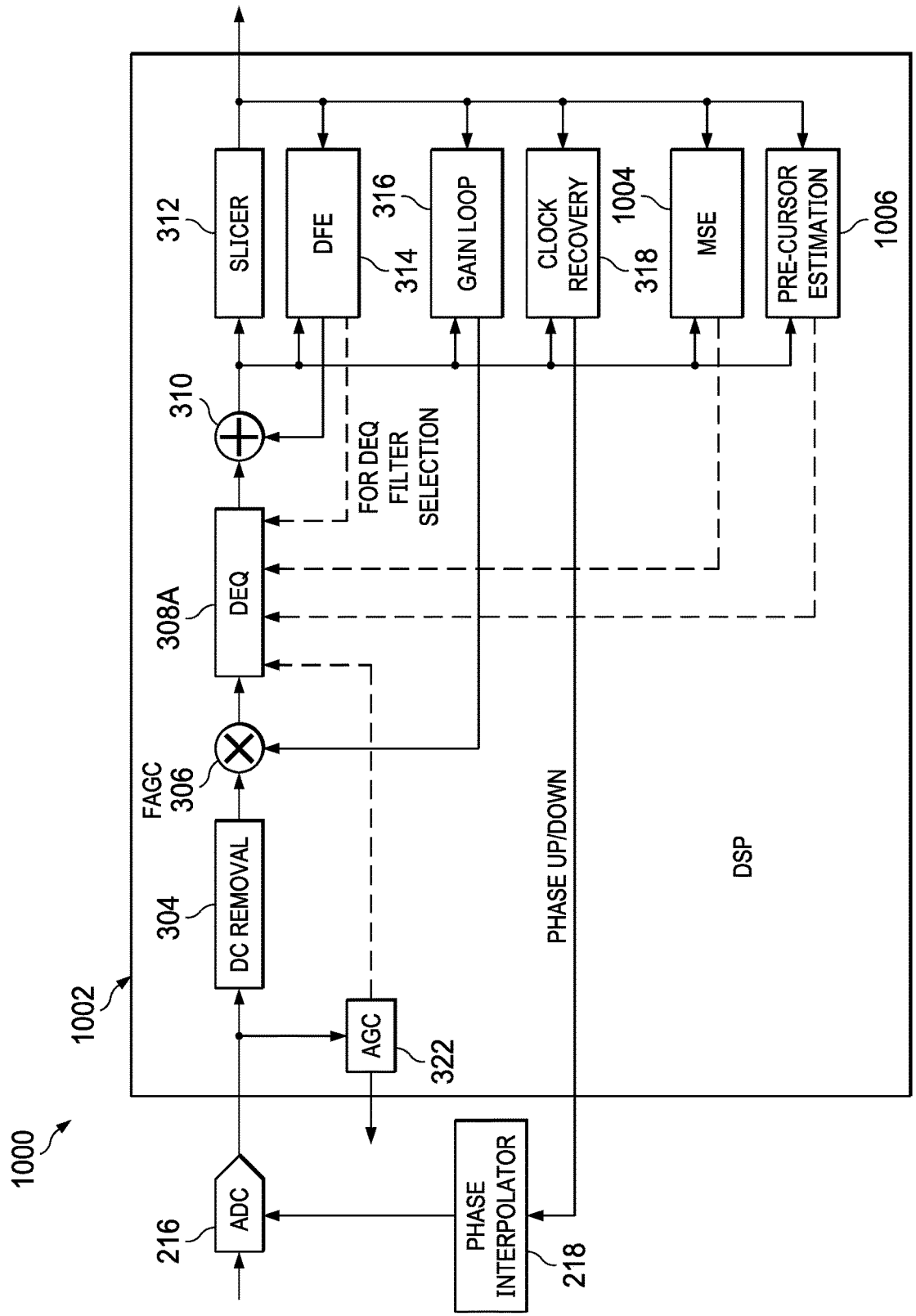
FIG. 10 is a block diagram showing part of another receiver in accordance with some examples.

FIG. 10 is a block diagram showing part of another receiver 1000 (an example of the receiver 110 in FIG. 1, or the receiver portion 210 in FIG. 2) in accordance with some examples. As shown, the receiver 1000 includes the ADC 216 and the phase interpolator 218 introduced in FIG. 2. The receiver 1000 also includes a DSP 1002 (an example of the digital processing circuit 114 of FIG. 1, or the DSP 221 of FIG. 2). As shown, the DSP 1002 includes various components introduced in FIG. 3, including the DC removal circuit 304, the AGC circuit 322, the multiplication circuit 306, the combine circuit 310, the slicer circuit 312, the DFE circuit 314, the gain loop circuit 316, and the clock recovery circuit 318. In the example of FIG. 10, the DSP 1002 includes a DEQ circuit 308A that uses a combination of signals to choose a DEQ filter option. Example signals that may be used by the DEQ circuit 308A includes an AGC index value from the AGC circuit 322, a DFE coefficient from the DFE circuit 314, an MSE value from an MSE circuit 1004, and pre-cursor values from a pre-cursor estimation circuit 1006.

In the example of FIG. 10, the DSP 1002 includes a modified DEQ circuit 308A that uses a combination of signals to choose a DEQ filter option. The DSP 1002 also includes an MSE circuit 1004 and a pre-cursor estimation circuit 1006 in the loop between the slicer circuit 312 and the combine circuit 310. In some examples, the MSE circuit 1004 receives the output of the combine circuit 310 and the output of the slicer circuit 312 as inputs, where the output of the MSE circuit 1004 is provided to the DEQ circuit 308A. Also, the pre-cursor estimation circuit 1006 receives the output of the combine circuit 310 and the output of the slicer circuit 312 as inputs, where the output of the pre-cursor estimation circuit 1006 is provided to the DEQ circuit 308A. The DEQ circuit 308A may also receive a DFE coefficient from the DFE circuit 314.

In different examples, the DEQ circuit 308A uses one or more of the available input signals or values to select a DEQ filter option include an AGC index value from the AGC circuit 322, a DFE coefficient from the DFE circuit 314, an MSE value from an MSE circuit 1004, and pre-cursor values from a pre-cursor estimation circuit 1006. For example, the DEQ circuit 308 may include a controller (not shown) configured use only one of the control signals or values represented in FIG. 10. Alternatively, the DEQ circuit 308 may include a controller (not shown) configured use a plurality of the control signals or values represented in FIG. 10. As desired, the controller may give different priorities or weights to different control signal options.

In the example of FIG. 10, the DC removal circuit 304 filters a DC component from the output of the ADC 216 and provides an output to the multiplication circuit 306. The multiplication circuit 306 multiplies the output of the DC removal circuit 304 and the output of the gain loop circuit 316. As shown, the output of the multiplication circuit 306 is provided to the DEQ circuit 308A. Again, the DEQ circuit 308A may include a controller (not shown) and a DEQ filter, where the controller selects between different DEQ filter options based on one or more control signals or values as described previously. The selected DEQ filter option is used by the DEQ circuit 308A to perform DEQ filtering. As shown, the output of the DEQ circuit 308A is provided to the combine circuit 310, where the combine circuit 310 is configured to combine the output of the DEQ circuit 308A with the output of the DFE circuit 314.

In the example of FIG. 10, the DFE circuit 314 and the gain loop circuit 316 are coupled to the output of the combine circuit 310 and to the output of the slicer circuit 312. The clock recovery circuit 318 is also coupled to the output of the slicer circuit 312. In the example of FIG. 10, the clock recovery circuit 318 uses the output of the slicer circuit 312 and the output of the combine circuit 310 to determine an adjustment signal (e.g., phase up or phase down) for the phase interpolator 218.

Figure 11:
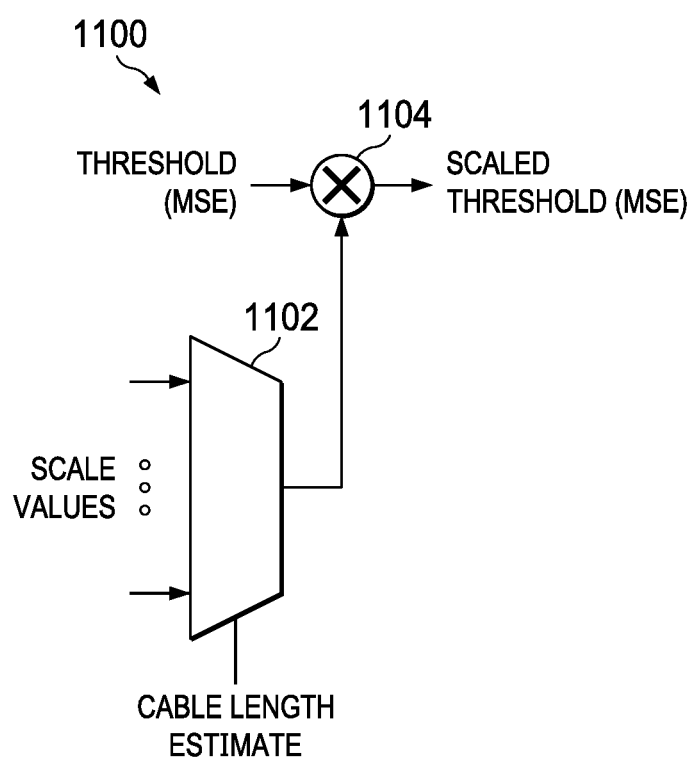
FIG. 11 is a schematic diagram showing a mean-square-error scaling circuit in accordance with some examples.

FIG. 11 is a schematic diagram showing an MSE scaling circuit 1100 in accordance with some examples. As shown, the MSE scaling circuit 1100 includes a multiplication circuit 1104 and a multiplexer 1102. More specifically, the multiplication circuit 1104 is configured to multiply an MSE threshold by a scaling value selected by the multiplexer 1102. In some examples, the scaling value is selected from a plurality of scaling values based on a cable length estimate. The scaled MSE threshold is used, for example, by the DEQ circuit 108A as a performance metric to determine when a DEQ filter option being tested is optimal or acceptable.

Figure 12:
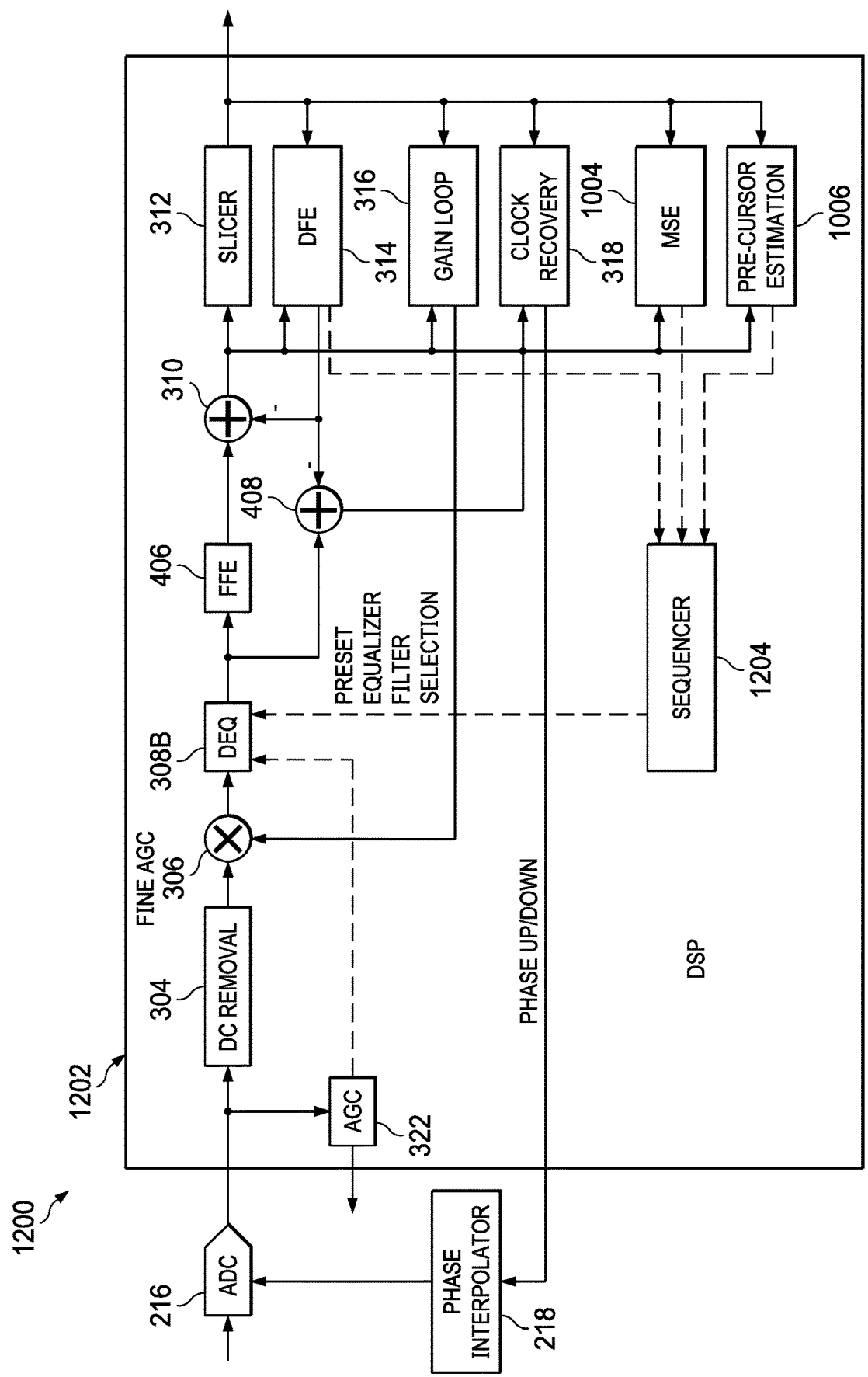
FIG. 12 is a block diagram showing part of another receiver in accordance with some examples.

FIG. 12 is a block diagram showing part of another receiver 1200 (an example of the receiver 110 in FIG. 1, or the receiver portion 210 in FIG. 2) in accordance with some examples. As shown, the receiver 1200 includes the ADC 216 and the phase interpolator 218 introduced in FIG. 2. The receiver 1200 also includes a DSP 1202 (an example of the digital processing circuit 114 of FIG. 1, or the DSP 221 of FIG. 2). As shown, the DSP 1202 includes various components introduced in FIG. 3, including the DC removal circuit 304, the AGC circuit 322, the multiplication circuit 306, the combine circuit 310, the slicer circuit 312, the DFE circuit 314, the gain loop circuit 316, and the clock recovery circuit 318. In the example of FIG. 12, the DSP 1202 also includes the combine circuit 408 of FIG. 4. The DSP 1202 also includes the MSE circuit 1004 and the pre-cursor estimation circuit 1006 of FIG. 10. The DSP 1202 also includes a sequencer 1204 coupled to the DFE circuit 314, the MSE circuit 1004, the pre-cursor estimation circuit 1006, and the DEQ circuit 308B.

In operation, the sequencer 1204 is configured to perform sweep operations involving different DEQ filter options. In the example of FIG. 12, the sequence 1204 may assist with determining which of a plurality of DEQ filter options will be used by the DEQ circuit 308B based on at least one of a DFE coefficient from the DFE circuit 314, an MSE value from the MSE circuit 1004, and pre-cursor values from the pre-cursor estimation circuit. Also, an AGC index value from the AGC circuit 322 may be provided to the DEQ circuit 308B. In some examples, the DEQ circuit 308B uses a combination of signals to choose a DEQ filter option. For example, the DEQ circuit 308B may include a controller (not shown) configured to use an AGC index value and sweep operation results (relative to a performance metric) from the sequencer 1204.

In the example of FIG. 12, the DC removal circuit 304 filters a DC component from the output of the ADC 216 and provides an output to the multiplication circuit 306. The multiplication circuit 306 multiplies the output of the DC removal circuit 304 and the output of the gain loop circuit 316. As shown, the output of the multiplication circuit 306 is provide to the DEQ circuit 308B. Again, the DEQ circuit 308B may include a controller (not shown) and a DEQ filter, where the controller selects between different DEQ filter options based on one or more control signals or values as described previously. The selected DEQ filter option is used by the DEQ circuit 308B to perform DEQ filtering. As shown, the output of the DEQ circuit 308B is provided to the combine circuit 310 via the FFE circuit 406, where the combine circuit 310 is configured to combine the output of the DEQ circuit 308B or the FFE circuit 406 with the output of the DFE circuit 314.

In the example of FIG. 10, the DFE circuit 314 and the gain loop circuit 316 are coupled to the output of the combine circuit 310 and to the output of the slicer circuit 312. The clock recovery circuit 318 is also coupled to the output of the slicer circuit 312. In the example of FIG. 10, the clock recovery circuit 318 uses the output of the slicer circuit 312 and the output of the combine circuit 310 to determine an adjustment signal (e.g., phase up or phase down) for the phase interpolator 218. Also, the DFE circuit 324, the MSE circuit 1004, and the pre-cursor estimation circuit 1006 provide respective signals or values to the sequencer 1204 as described previously.

Figure 13:
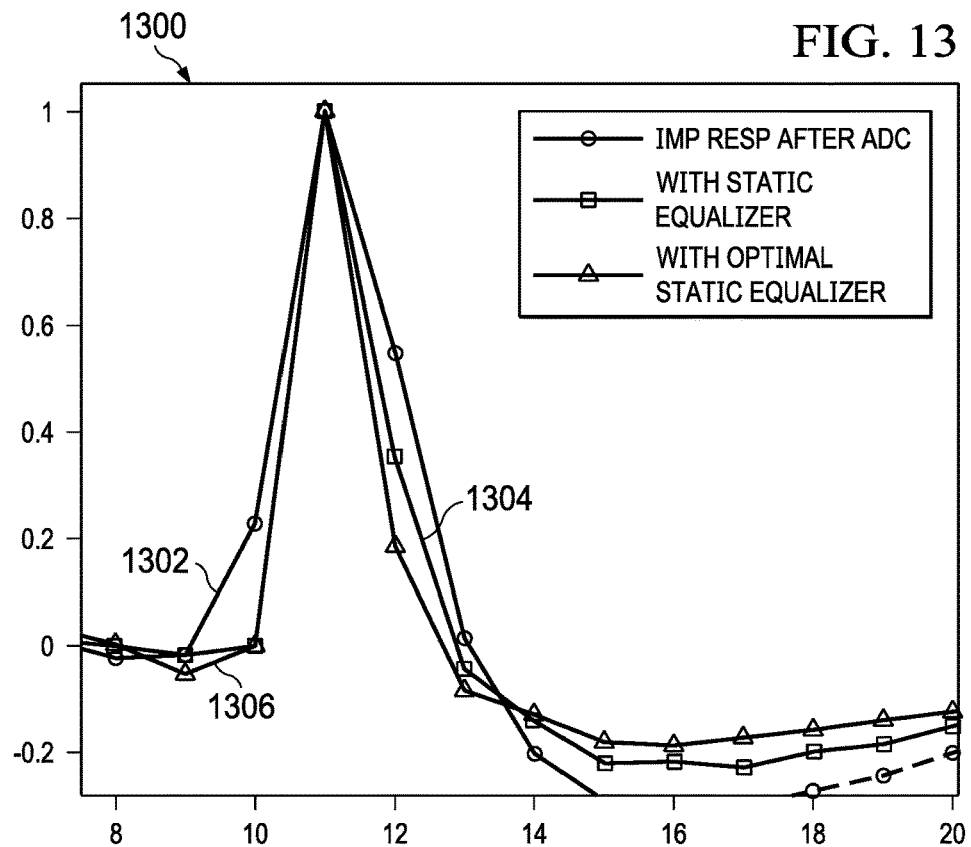
FIG. 13 is a graph showing impulse responses resulting from ADC operations, static equalizer operations, and optimal static equalizer operations in accordance with some examples.

FIG. 13 is a graph 1300 showing impulse responses 1302, 1304, and 1306 resulting from ADC operations, static equalizer operations, and optimal static equalizer operations in accordance with some examples. In graph 1300, the impulse response 1302 corresponds to an impulse response after ADC operations, the impulse response 1304 corresponds to an impulse response with static equalizer operations, and the impulse response 1306 corresponds to an impulse response with optimal static equalizer operations. As represented in graph 1300, the pre-cursor values for the impulse responses 1302, 1304, and 1306 are similar with some improvement in the sharpness of the impulse responses 1304 and 1306 relative to the impulse response 1302. Also, the post-cursor values for the impulse response 1304 is improved relative to the impulse response 1302. Also, the post-cursor values for the impulse response 1306 is improved relative to the impulse responses 1302 and 1304.

Figure 14:
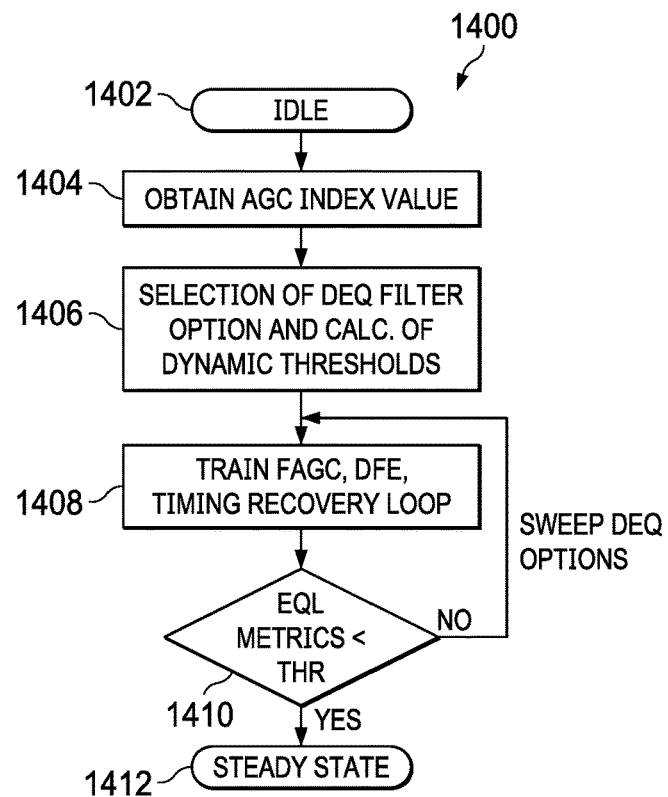
FIG. 14 is a flowchart showing a DEQ filtering method in accordance with some examples.

FIG. 14 is a flowchart showing a DEQ filtering method 1400 in accordance with some examples. The method 1400 is performed, for example, by DSP components or DEQ controller components as described herein. As shown, the method 1400 comprises an idle state at block 1402. At block 1404, an AGC index value is obtained. At block 1406, a DEQ filter option is selected based on the AGC index value and dynamic thresholds (e.g., MSE and DFE thresholds) are calculated. In some examples, the MSE and DFE thresholds are scaled depending on the channel (e.g., cable) length. For example, a 100 m cable has higher MSE (noise) compared to a 10 m cable. Similarly, the first DFE coefficient changes with cable length. Based on the cable length estimate (e.g., from the AGC index value), the MSE threshold is scaled and then used for DEQ calibration. The AGC index value corresponds to the gain (in dB) that is applied to a received signal and is one way to estimate channel length.

At block 1408, the fine AGC loop, the DFE loop, and the timing recovery loop are trained. If the equalization performance metric results are less than a threshold (determination block 1410), a sweep operation is performed, and the method returns to block 1408. In some examples, the sweep operations start with a higher boosting DEQ filter and then sweep to lower boosting DEQ filters that reduce MSE. The sweep operations stop when performance metrics are met. Once a DEQ filter option results in equalization performance metrics greater than the threshold (determination block 1410), the method 1400 transitions to steady state operations at block 1412. In different examples, the method 1400 may vary with regard to how/if the AGC index value is used, how/if sweep operations are performed, and how/if performance metrics are used or adjusted.

Figure 15:
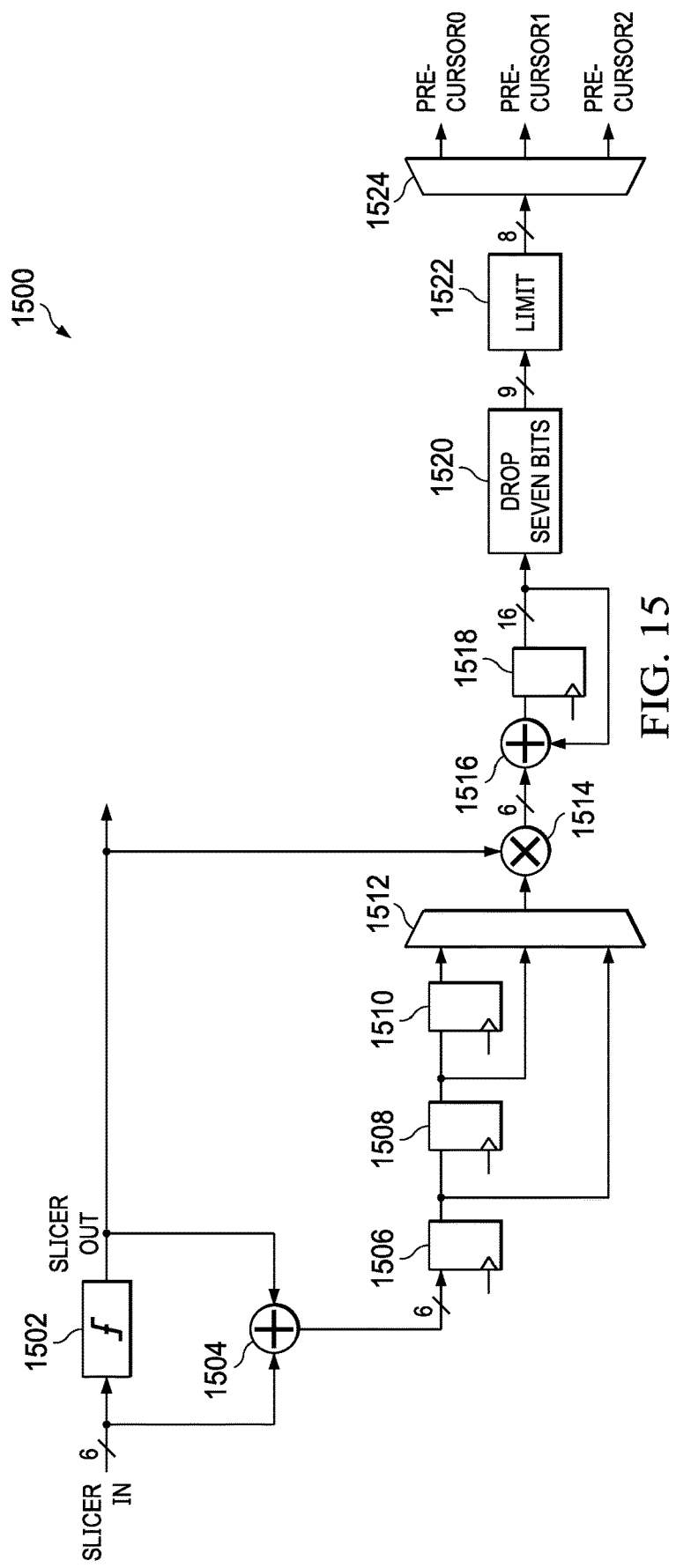
FIG. 15 is a schematic diagram showing a pre-cursor selection circuit in accordance with some examples.

FIG. 15 is a schematic diagram showing a pre-cursor selection circuit 1500 (an example of the pre-cursor circuit 1006 in FIGS. 10 and 12) in accordance with some examples. In operation, the pre-cursor selection circuit 1500 is configured to perform pre-cursor ISI estimation by obtaining one or more correlation factors (also called pre-cursor values) that correlate a delayed slicer error with a current slicer output. The pre-cursor values are used to select a given DEQ filter option or otherwise calibrate a DEQ filter.

As shown, the pre-cursor selection circuit 1500 comprises a slicer circuit 1502, where the slicer input and the slicer output are compared by a combine circuit 1504. In some examples, the input signal to the slicer 1502 and the output from the combine circuit 1504 are 6-bit signals. The difference between the slicer input and the slicer output is an indication of noise introduced by the slicer circuit 1502. This noise value at a particular delay time is compared with the output of the slicer circuit 1502 using a multiplication circuit 1514. More specifically, the noise value at different delays due to the latches 1506, 1508, and 1510 are provided to a multiplexer 1512, where one of the noise values is selected as the inputs to the multiplication circuit 1514. The output of the multiplication circuit 1514 is provided to a combine circuit 1516. In some examples, the output of the multiplication circuit 1514 is a 6-bit signal. The output of the combine circuit 1516 is provided to a latch 1518. In some examples, the output of the latch 1518 corresponds to a 16-bit signal that is provided back to the combine circuit 1516 and is provided to a circuit 1520 configured to drop 7 bits of the 16-bit signal output from the latch 1518. The output of the circuit 1520 (e.g., a 9-bit signal) is provided to a limit circuit 1522. The output of the limit circuit 1522 (e.g., an 8-bit signal) is provided to a de-multiplexer 1524. The outputs of the de-multiplexer 1524 correspond to pre-cursor values (e.g., pre-cursor0, pre-cursor0, pre-cursor2), which may be used by a DSP or DEQ controller to select which of a plurality of DEQ filter options to use for DEQ operations as described herein.

Figure 16:
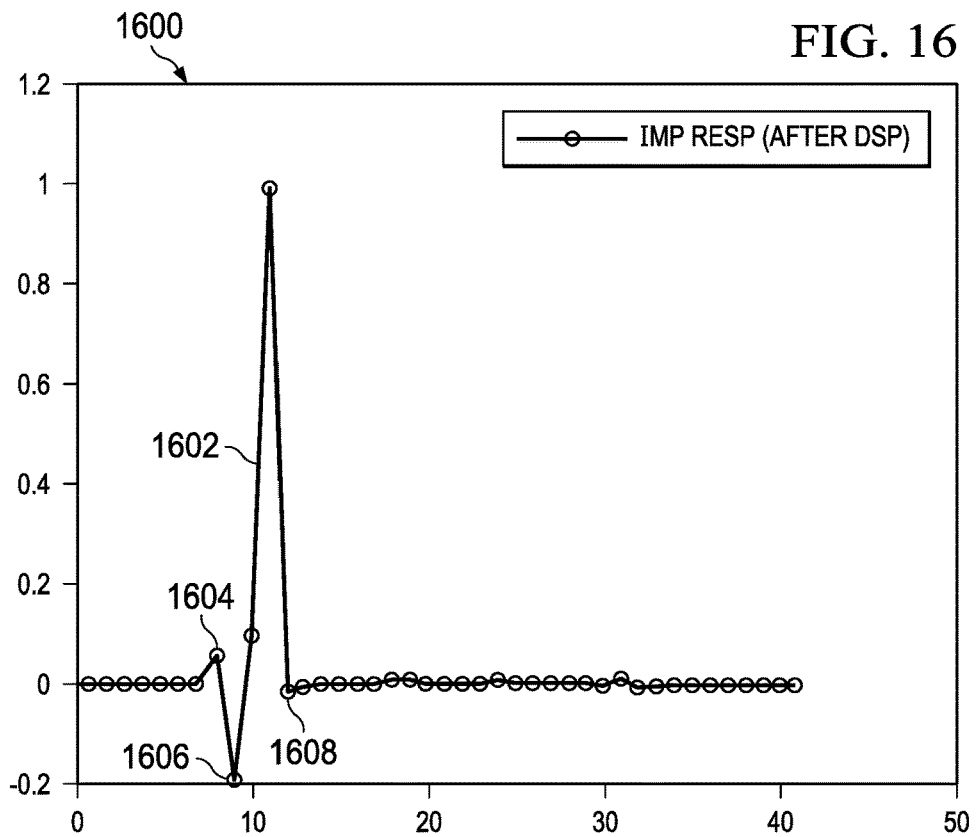
FIG. 16 is a graph showing an impulse response resulting from DSP operations in accordance with some examples.

FIG. 16 is a graph 1600 showing an impulse response 1602 resulting from DSP operations in accordance with some examples. As shown, the impulse response 1602 includes inaccurate pre-cursor values 1604 and 1606. Meanwhile, the post-cursor value 1608 is sufficiently accurate. In some examples, pre-cursor values are used as an equalization performance metric, which can be used to select one of a plurality of DEQ filter options.

Figure 17:
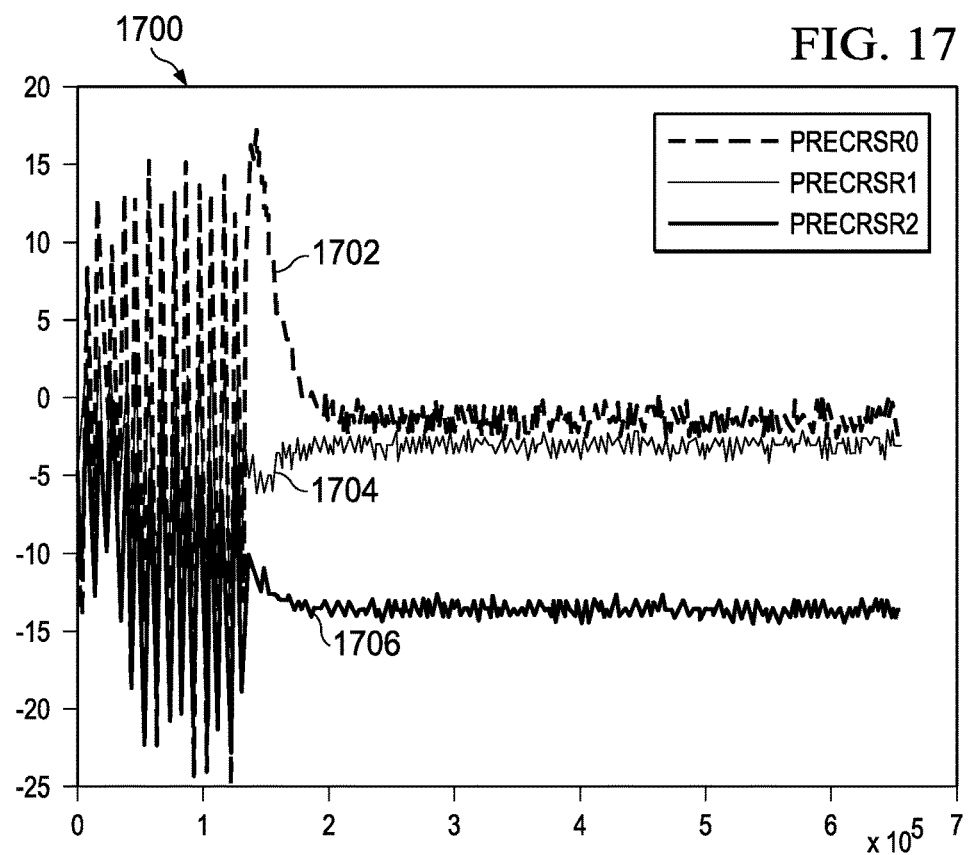
FIG. 17 is a graph showing waveforms related to different pre-cursor values in accordance with some examples.

FIG. 17 is a graph 1700 showing waveforms 1702, 1704, and 1706 related to different pre-cursor values in accordance with some examples. The graph 1700 shows convergence of pre-cursor ISI values, which are proportional to the pre-cursor values in graph 1600.

Figure 18:
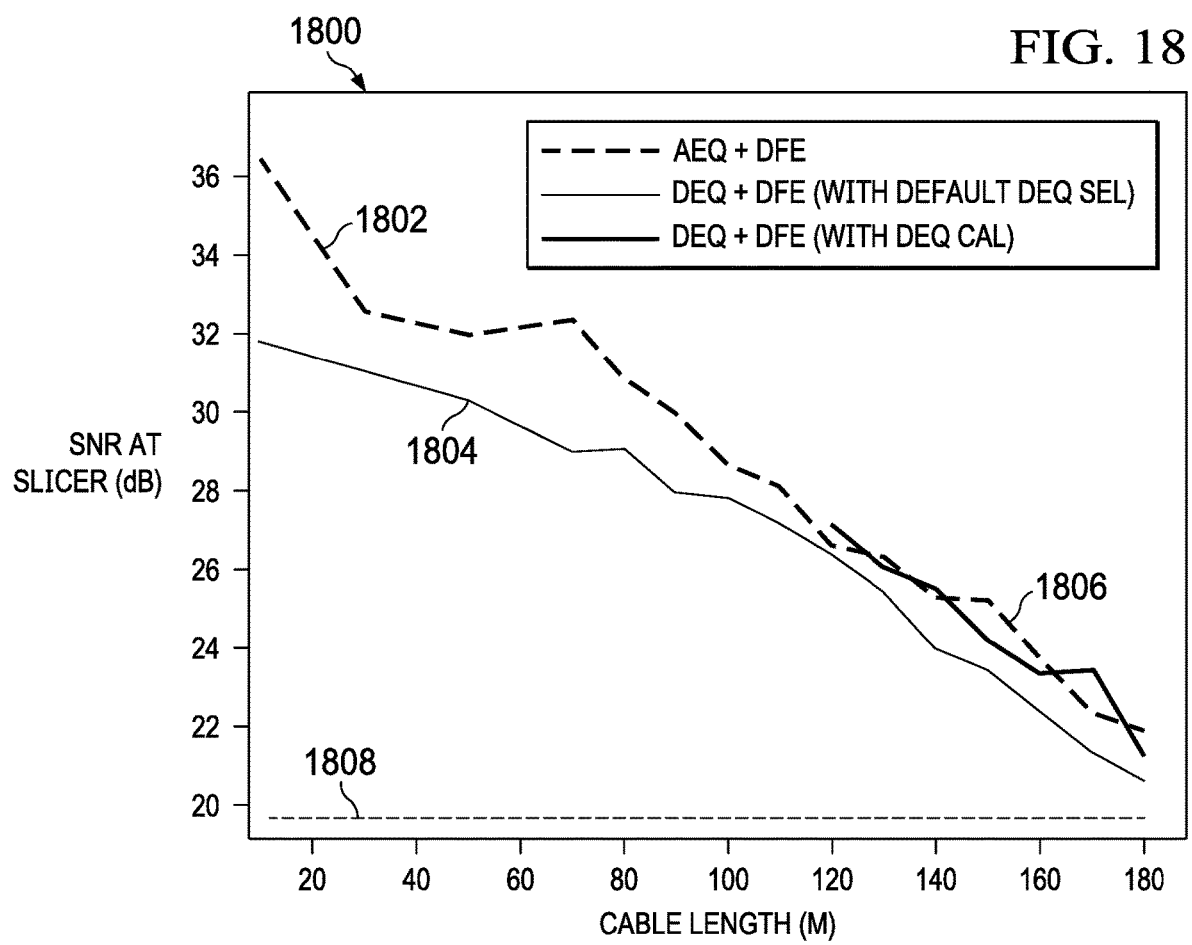
FIG. 18 is a graph showing signal-to-noise ratio (SNR) as function of cable length for different equalization strategies in accordance with some examples.

FIG. 18 is a graph 1800 showing signal-to-noise ratio (SNR) as function of cable length for different equalization strategies in accordance with some examples. In graph 1800, line 1802 corresponds to the SNR performance relative to cable length for equalization involving analog equalization (AEQ) and DFE. Meanwhile, line 1804 corresponds to the SNR performance relative to cable length for equalization that involves DEQ and DFE, where the DEQ filter option is selected based on an indexed DEQ selection. Finally, line 1806 corresponds to the SNR performance relative to cable length for equalization that involves DEQ and DFE, where the DEQ filter option is selected based on DEQ calibration operations (e.g., a sweep of DEQ filter options with performance metrics calibrated using a DFE coefficient, an MSE threshold, a scaled MSE threshold, and/or pre-cursor options) as described herein. As represented in graph 1800, DEQ and DFE operations (AEQ omitted) are competitive with AEQ and DFE operations. Advantageously, there is an IC size and cost reduction for DEQ and DFE options relative to AEQ and DFE options.

In some examples, a proposed device (e.g., the receiver 110 as in FIG. 1, the transceiver 200 in FIG. 2, or a related IC, die, or chip) includes a receiver (e.g., the receiver 110 in FIG. 1, or the receiver 210 in FIG. 2) having: 1) analog front-end circuitry (e.g., the analog processing circuit 112 in FIG. 1, or components of the analog domain 211 in FIG. 2). The receiver also includes a digital signal processing (DSP) circuit (e.g., the digital processing circuit 114 in FIG. 1, the DSP 221 in FIG. 2, the DSP 302 in FIG. 3, the DSP 404 in FIG. 4, the DSP 1002 in FIG. 10, the DSP 1202 in FIG. 12), wherein the DSP circuit is configured to select one of a plurality of DEQ filter options and to perform equalization operations based on the selected filter option. In some examples, the DSP circuit is configured to select one of the plurality of DEQ filter options based on a channel length estimate and a plurality of different sets of DEQ filter coefficients predetermined for different channel lengths.

In some examples, the DSP circuit is configured to select one of the plurality of DEQ filter options (e.g., using the DEQ circuit 308 in FIGS. 3 and 4, the DEQ circuit 308A in FIG. 10, or the DEQ circuit 308B in FIG. 12) based on an automatic gain control index value (e.g., from the AGC circuit 322 in FIGS. 3, 4, 10, and 12) and a plurality of different sets of DEQ filter coefficients (e.g., $h_0$ and $h_1$ in FIG. 5) predetermined for different channel lengths. In some examples, the DEQ filter (e.g., part of the DEQ circuit 308 in FIGS. 3 and 4, part of the DEQ circuit 308A in FIG. 10, or part of the DEQ circuit 308B in FIG. 12) is part of a timing recovery loop (e.g., the loop formed in part by the clock recovery circuit 318 and the phase interpolator 218 in FIGS. 3, 4, 10, and 12), wherein the DEQ filter is followed by a DFE (e.g., the DFE circuit 314 in FIG. 4) and an FFE (e.g., the FFE circuit 406 in FIGS. 4 and 12), and wherein equalization based on the selected filter option is performed before the DFE, the FFE, and timing recovery.

In some examples, the DSP is configured to selectively perform FFE operations, and wherein FFE results are not used by the timing recovery loop (e.g., the FFE circuit 406 in FIGS. 4 and 12 can be bypassed through the combine circuit 408). In some examples, the plurality of DEQ filter options are based on an odd tap symmetric FIR filter (e.g., the DEQ filter arrangement 500 in FIG. 5) with selectable coefficients (e.g., $h_0$ and $h_1$ in FIG. 5). In some examples, the DSP circuit is configured to select one of the plurality of DEQ filter options based on a sweeping operation (see e.g., the DEQ filter options for the DEQ filters 116 in FIG. 1) that determines which of a plurality of different sets of DEQ filter coefficients optimizes a performance metric. In some examples, the performance metric is at least one of a DFE coefficient metric, an MSE noise metric, and a pre-cursor value (see e.g., the DEQ filter options for the DEQ filters 116 in FIG. 1).

In some examples, the DSP is configured to perform pre-cursor ISI estimation (e.g., using the pre-cursor selection circuit 1500 in FIG. 15) and to calibrate the selected filter option based on the pre-cursor ISI estimation, and wherein the DSP is configured to perform the pre-cursor ISI estimation by obtaining at least one correlation factor (e.g., pre-cursor0, pre-cursor1, and pre-cursor2 in FIG. 15) that correlates a delayed slicer error with a current slicer output. In some examples, the selected DEQ filter is configured to run at one sample per symbol.

In some examples, a proposed DSP circuit (e.g., the digital processing circuit 114 in FIG. 1, the DSP 221 in FIG. 2, the DSP 302 in FIG. 3, the DSP 404 in FIG. 4, the DSP 1002 in FIG. 10, the DSP 1202 in FIG. 12) includes a DEQ filter (e.g., part of the DEQ circuit 308 in FIGS. 3 and 4, part of the DEQ circuit 308A in FIG. 10, or part of the DEQ circuit 308B in FIG. 12) with selectable coefficients (e.g., $h_0$ and $h_1$ in FIG. 5). The DSP circuit also includes a decision circuit such as a slicer circuit (e.g., the slicer circuit 312 in FIGS. 3, 4, 10, and 12) coupled to the DEQ filter. The DSP circuit also includes a DFE circuit (e.g., the DFE circuit 314 in FIGS. 3, 4, 10, and 12) coupled to the DEQ filter. The DSP circuit also includes a gain loop circuit (e.g., the gain loop circuit 316 in FIGS. 3, 4, 10, and 12) coupled to the DEQ filter. The DSP circuit also includes a clock recovery circuit (e.g., the clock recovery circuit 318 in FIGS. 3, 4, 10, and 12) coupled to the slicer circuit. The DSP circuit also includes a controller (e.g., part of the DEQ circuit 308 in FIGS. 3 and 4, part of the DEQ circuit 308A in FIG. 10, or part of the DEQ circuit 308B in FIG. 12) coupled to the DEQ filter, wherein the controller is configured to select the coefficients for the DEQ filter based on at least one selection criterion (see e.g., the DEQ filter options for the DEQ filters 116 in FIG. 1).

In some examples, the DEQ filter is part of a timing recovery loop (e.g., the loop formed in part by the clock recovery circuit 318 and the phase interpolator 218 in FIGS. 3, 4, 10, and 12), and wherein the DEQ filter is followed by a DFE (e.g., the DFE circuit 314 in FIGS. 3, 4, 10, and 12) and an FFE (e.g., the FFE circuit 406 in FIGS. 4 and 12), and wherein equalization based on the selected filter option is performed before the DFE, the FFE, and timing recovery.

In some examples, an output of the FFE is provided to the slicer circuit and is not provided to the clock recovery circuit. In some examples, the DEQ filter is an odd tap symmetric FIR filter (e.g., the DEQ filter arrangement 500 in FIG. 5) with selectable coefficients (e.g., $h_0$ and $h_1$ in FIG. 5), and wherein the at least one selection criterion comprises a channel length estimate. In some examples, the at least one selection criterion comprises an automatic gain control index value (e.g., from the AGC circuit 322 in FIGS. 3, 4, 10, and 12). In some examples, the at least one selection criterion comprises a performance metric based on a sweeping operation (see e.g., the DEQ filter options for the DEQ filters 116 in FIG. 1) that tests different sets of DEQ filter coefficients. In some examples, the performance metric is at least one of a DFE coefficient metric, an MSE noise metric, and a pre-cursor value (see e.g., the DEQ filter options for the DEQ filters 116 in FIG. 1). In some examples, the controller is configured to calibrate the performance metric based on scaling an MSE threshold (e.g., using the MSE scaling circuit 1100 in FIG. 11).

In some examples, a proposed method includes receiving an input signal (e.g., RX input in FIG. 2) and filtering the input signal using an analog filter system (e.g., using filter 212 and 214 of the analog domain 211 in FIG. 2). The proposed method also includes converting an output of the analog filter system to a digital signal (e.g., using the ADC 216 in FIG. 2) and selecting one of a plurality of DEQ filter options (see e.g., the DEQ filter options for the DEQ filters 116 in FIG. 1). The proposed method also includes filtering the digital signal based on the selected DEQ filter option (e.g., to obtain the equalized signal 132 in FIG. 1, or the equalized signal 226 in FIG. 2). In some examples, the selected DEQ filter option is selected using the DEQ filtering method 1400 of FIG. 14 and/or other filter selection techniques described herein.

In some examples, selecting one of the plurality of DEQ filter options (see e.g., the DEQ filter options for the DEQ filters 116 in FIG. 1) comprises comparing a channel length estimate to an indexed DEQ filter coefficient table (see e.g., the DEQ coefficient table input to the multiplexer 502 with an AGC index control signal in FIG. 5). In some examples, selecting one of the plurality of DEQ filter options comprises testing a plurality of different sets of DEQ filter coefficients and selecting a set of DEQ filter coefficients that result in a performance metric being within a threshold (see e.g., the sweeping options described for the DEQ filters 116 in FIG. 1). In some examples, the performance metric is at least one of a DFE coefficient metric and an MSE noise metric (see e.g., the DEQ filter options for the DEQ filters 116 in FIG. 1). In some examples, the performance metric is a pre-cursor value (e.g., from the pre-cursor selection circuit 1500) that correlates a delayed slicer error with a current slicer output.

Certain terms have been used throughout this description and claims to refer to particular system components. As one skilled in the art will appreciate, different parties may refer to a component by different names. This document does not intend to distinguish between components that differ only in name but not in their respective functions or structures. In this disclosure and claims, the terms "including" and "comprising" are used in an open-ended fashion, and thus should be interpreted to mean "including, but not limited to . . . ."

The term "couple" is used throughout the specification. The term may cover connections, communications, or signal paths that enable a functional relationship consistent with the description of the present disclosure. For example, if device A generates a signal to control device B to perform an action, then a first example device A is coupled to device B, or then a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A device, comprising:
a receiver having:
analog front-end circuitry; and
a digital signal processing (DSP) circuit, wherein the DSP circuit is configured to select one of a plurality of digital equalization (DEQ) filter options and to perform equalization operations based on the selected filter option, and wherein the DSP circuit is configured to select one of the plurality of DEQ filter options based on a channel length estimate and a plurality of different sets of DEQ filter coefficients predetermined for different channel lengths;
wherein the DEQ filter is part of a timing recovery loop, wherein the DEQ filter is followed by a decision feedback equalizer (DFE) and a feed-forward equalizer (FFE), and wherein equalization based on the selected filter option is performed before the DFE, the FFE, and timing recovery.

2. A device, comprising:
  a receiver having:
    analog front-end circuitry; and
    a digital signal processing (DSP) circuit, wherein the DSP circuit is configured to select one of a plurality of digital equalization (DEQ) filter options and to perform equalization operations based on the selected filter option, and wherein the DSP circuit is configured to select one of the plurality of DEQ filter options based on a channel length estimate and a plurality of different sets of DEQ filter coefficients predetermined for different channel lengths;
  wherein the DSP circuit is configured to selectively perform feed-forward equalization (FFE) operations, and wherein FFE results are not used by the timing recovery loop.

3. A device, comprising:
  a receiver having:
    analog front-end circuitry; and
    a digital signal processing (DSP) circuit, wherein the DSP circuit is configured to select one of a plurality of digital equalization (DEQ) filter options and to perform equalization operations based on the selected filter option, and wherein the DSP circuit is configured to select one of the plurality of DEQ filter options based on a channel length estimate and a plurality of different sets of DEQ filter coefficients predetermined for different channel lengths;
  wherein the DSP circuit is configured to perform pre-cursor inter-symbol interference (ISI) estimation and to calibrate the selected filter option based on the pre-cursor ISI estimation, and wherein the DSP circuit is configured to perform the pre-cursor ISI estimation by obtaining at least one correlation factor that correlates a delayed slicer error with a current slicer output.

4. A digital signal processing (DSP) circuit, comprising:
  a digital equalizer (DEQ) filter with selectable coefficients;
  a decision circuit coupled to the DEQ filter;
  a decision-feedback equalizer (DFE) circuit coupled to the DEQ filter;
  a gain loop circuit coupled to the DEQ filter;
  a clock recovery circuit coupled to the decision circuit; and
  a controller coupled to the DEQ filter, wherein the controller is configured to select the coefficients for the DEQ filter based on at least one selection criterion;
  wherein the DEQ filter is part of a timing recovery loop, and wherein the DEQ filter is followed by the decision feedback equalizer (DFE) and a feed-forward equalizer (FFE), and wherein equalization is based on the selected coefficients for the DEQ filter being selected before the DFE, the FFE, and timing recovery.

5. The DSP circuit claim 4, wherein an output of the FFE is provided to the decision circuit and is not provided to the clock recovery circuit.

6. A method, comprising:
  receiving an input signal;
  filtering the input signal using an analog filter system;
  converting an output of the analog filter system to a digital signal;
  selecting one of a plurality of digital equalization (DEQ) filter options; and
  filtering the digital signal based on the selected DEQ filter option;
  wherein selecting one of the plurality of DEQ filter options comprises testing a plurality of different sets of DEQ filter coefficients and selecting a set of DEQ filter coefficients that result in a performance metric being within a threshold;
  wherein the performance metric is a pre-cursor value that correlates a delayed slicer error with a current slicer output.

* * * * *